United States Patent
Thomas et al.

(10) Patent No.: US 8,647,225 B2
(45) Date of Patent: Feb. 11, 2014

(54) TRANSFER CASE FOR A MOTOR VEHICLE POWERTRAIN

(75) Inventors: Steven G. Thomas, Bloomfield Hills, MI (US); Andreas E. Perakes, Canton, MI (US); Matthew D. Hammond, Dearborn, MI (US); Steven A. Frait, Milan, MI (US); Monica R. DeGraffenreid, Milford, MI (US); Gregory D. Goleski, Rochester Hills, MI (US); Chip Hartinger, Farmington Hills, MI (US); Jeffrey E. Maurer, Commerce, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1516 days.

(21) Appl. No.: 11/947,201

(22) Filed: Nov. 29, 2007

(65) Prior Publication Data
US 2009/0143182 A1 Jun. 4, 2009

(51) Int. Cl.
*F16H 57/04* (2010.01)
(52) U.S. Cl.
USPC .......................................................... 475/159
(58) Field of Classification Search
None
See application file for complete search history.

(56) References Cited

U.S. PATENT DOCUMENTS

| | | | |
|---|---|---|---|
| 5,115,887 A * | 5/1992 | Smith | 184/6.4 |
| 5,704,863 A | 1/1998 | Zalewski et al. | |
| 5,845,756 A | 12/1998 | Dairokuno et al. | |
| 5,875,865 A | 3/1999 | Wakahara et al. | |
| 6,056,666 A | 5/2000 | Williams | |
| 6,234,125 B1 | 5/2001 | Neubauer et al. | |
| 6,457,564 B1 * | 10/2002 | Damm et al. | 184/6.5 |
| 6,458,056 B1 | 10/2002 | Brown et al. | |
| 6,582,331 B1 * | 6/2003 | Baxter, Jr. | 474/91 |
| 6,579,204 B2 | 7/2003 | Brown et al. | |
| 6,595,338 B2 | 7/2003 | Bansbach et al. | |
| 6,883,657 B2 | 4/2005 | Bansbach et al. | |
| 6,971,494 B2 | 12/2005 | Puiu | |
| 7,021,445 B2 | 4/2006 | Brissenden et al. | |
| 7,201,266 B2 | 4/2007 | Brissenden et al. | |
| 2005/0101429 A1 | 5/2005 | Allen et al. | |
| 2007/0093347 A1 | 4/2007 | Janson et al. | |

FOREIGN PATENT DOCUMENTS

GB 2408082 A 5/2005

* cited by examiner

*Primary Examiner* — Justin Holmes
(74) *Attorney, Agent, or Firm* — James Dottavio; MacMillan, Sobanski & Todd, LLC

(57) ABSTRACT

A motor vehicle powertrain includes a multiple speed transmission including a first lube circuit that supplies hydraulic lubricant to components of the transmission, a first oil sump, and a first pump driveably connected to an engine for supplying oil at a first pressure to the lube circuit, a transfer case including a first output, a second oil sump located in the transfer case, a second pump located in the transfer case and driveably connected to the first output, and a check valve for alternately opening and closing a connection between the first pump and the lube circuit and for opening and closing a connection between the second pump and the lube circuit in response to differential pressure between an outlet of the first pump and an outlet of the second pump.

20 Claims, 3 Drawing Sheets

TRANSFER CASE FOR A MOTOR VEHICLE POWERTRAIN

BACKGROUND OF THE INVENTION

1. Field of the Invention

This invention relates generally to a driveline for a motor vehicle, and in particular, to a driveline having a transfer case for directing power to front wheels and rear wheels.

2. Description of the Prior Art

A transfer case may include a planetary gear set for producing either a "high" range, in which the transfer case output is driven at the same speed as the input, or a "low" range, in which the output is driven slower than its input speed. The 4×2 (High), 4×4 (High) and 4×4 Low states of the transfer case are usually selected manually by the vehicle operator by operating a lever or switch. A first position of the lever will cause a range selection device in the transfer case to direct power from the transmission output to a rear drive axle, the 4×2 drive mode. A second position of the lever will cause the transfer case to direct power to both a front drive axle and a rear drive axle, the 4×4 drive mode. The last position will move the transfer case to low range Conventional rear wheel drive, on-demand transfer case systems use electromechanical actuation of the 4×4 on demand clutch. Length periods to engage the clutch can result in long duration and high speed wheel slip events before the clutch engages and torque is sent to the non-slipping wheels. Also long disengagement periods can interfere with brake traction control.

The high and low ranges are typically achieved by several methods: electric motor, mechanical lever or electro-hydraulically. An example of electro-hydraulic controls is accomplished by alternately engaging and disengaging a hydraulically actuated range clutch. When the 4×4 drive mode is selected, another hydraulic clutch is engaged. The hydraulic clutches that control high and low range operation typically include a clutch pack of alternating spacer plates and friction discs, which are forced into friction contact when a piston located in a cylinder is pressurized with hydraulic fluid, thereby engaging the clutch. The clutch is disengaged by venting the cylinder, which allows a spring to release the piston allowing the plates and discs to separate.

However, even when the discs and plates are disengaged, they are located in close mutual proximity so that the clutch can be quickly reengaged without loss of time required to first move the plates and discs together from a widely separated distance when the operator commands a range change. With the plates and discs closely spaced and the clutch disengaged, hydraulic fluid is continually supplied to the clutch pack in order to cool and lubricate the clutch. In this environment, hydraulic fluid between the discs and plates causes the clutch components to try to rotate due to viscous shear through the thickness of fluid between the plates and discs, even when the clutch is disengaged.

This action produces a continual drag on the powertrain components, increasing fuel consumption and adding to noise and noise amplification in the driveline. It is better to avoid these disadvantages and yet quickly respond to commands to change the selected range.

The multi-plate hydraulic clutch that is engaged when the low range is produced transmits torque that is amplified through operation of a gearset located in the transfer case between the transmission output shaft and the transfer case output. In order to transmit large torque magnitudes, potentially as large as the vehicle skid torque at which the wheels break free from frictional contact with a road surface, the size of the low range clutch is large. Its size presents packaging difficulties in the transfer case where two other clutches, an epicyclic train and a drive mechanism to the front wheels are also located. A solution is required to avoid the packaging difficulties presented by the size of a hydraulically actuated low range clutch.

SUMMARY OF THE INVENTION

A motor vehicle powertrain includes a multiple speed transmission including a first lube circuit that supplies hydraulic lubricant to components of the transmission, a first oil sump, and a first pump driveably connected to an engine for supplying oil at a first pressure to the lube circuit, a transfer case including a first output, a second oil sump located in the transfer case, a second pump located in the transfer case and driveably connected to the first output, and a check valve for alternately opening and closing a connection between the first pump and the lube circuit and for opening and closing a connection between the second pump and the lube circuit in response to differential pressure between an outlet of the first pump and an outlet of the second pump.

When the vehicle is being towed with its wheels contacting the ground and the engine not running, lubricant is supplied to the transmission lube circuit from a scavenge pump located in the transfer case and driven by the wheels.

It is an advantage of this invention that the driveline drag and fuel efficiency reduction associated with viscous shear continually present in a transfer case having at least one disengaged, hydraulically actuated range clutch is eliminated.

It is another advantage that unnecessary noise caused by continual rotation of the transfer case and driveline components unintentionally driven by a disengaged hydraulic clutch is eliminated.

It is yet another advantage that the space normally required to package a low range clutch and high range clutch in a transfer case is avoided. The design, manufacturing and assembly complexity and cost required to supply these clutches with hydraulic fluid and the control system features that synchronize their engagements and disengagements is eliminated.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
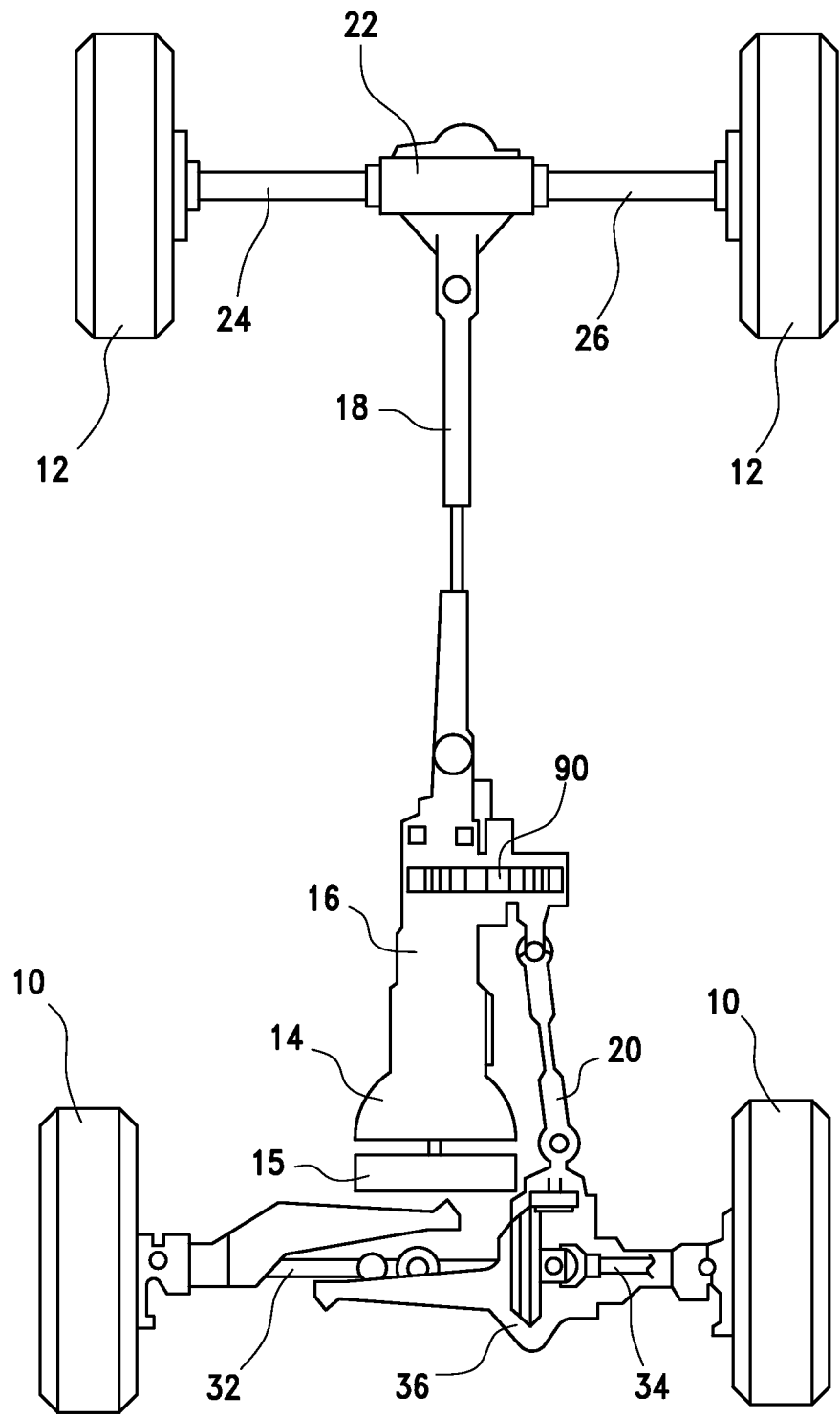
FIG. 1 is a top view of a motor vehicle driveline having a transmission, transfer case, and drive shafts extending to front wheels and rear wheels.

Referring now to the drawings, there is illustrated in FIG. 1 a powertrain for a motor vehicle, to which the present invention can be applied. The powertrain includes front and rear wheels 10, 12, a power transmission 14 for producing multiple forward and reverse speed ratios driven by an engine 15, and a transfer case 16 for continuously driveably connecting the transmission output to a rear drive shaft 18. The transfer case 16 continually connects the transmission output to the rear drive shaft 18, and selectively connects the transmission output to the front drive shaft 20 when a four wheel drive mode of operation is selected, either manually or electronically. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand half shafts 32, 34, to which power is transmitted from the front drive shaft 20 through a front differential mechanism 36.

Figure 2:
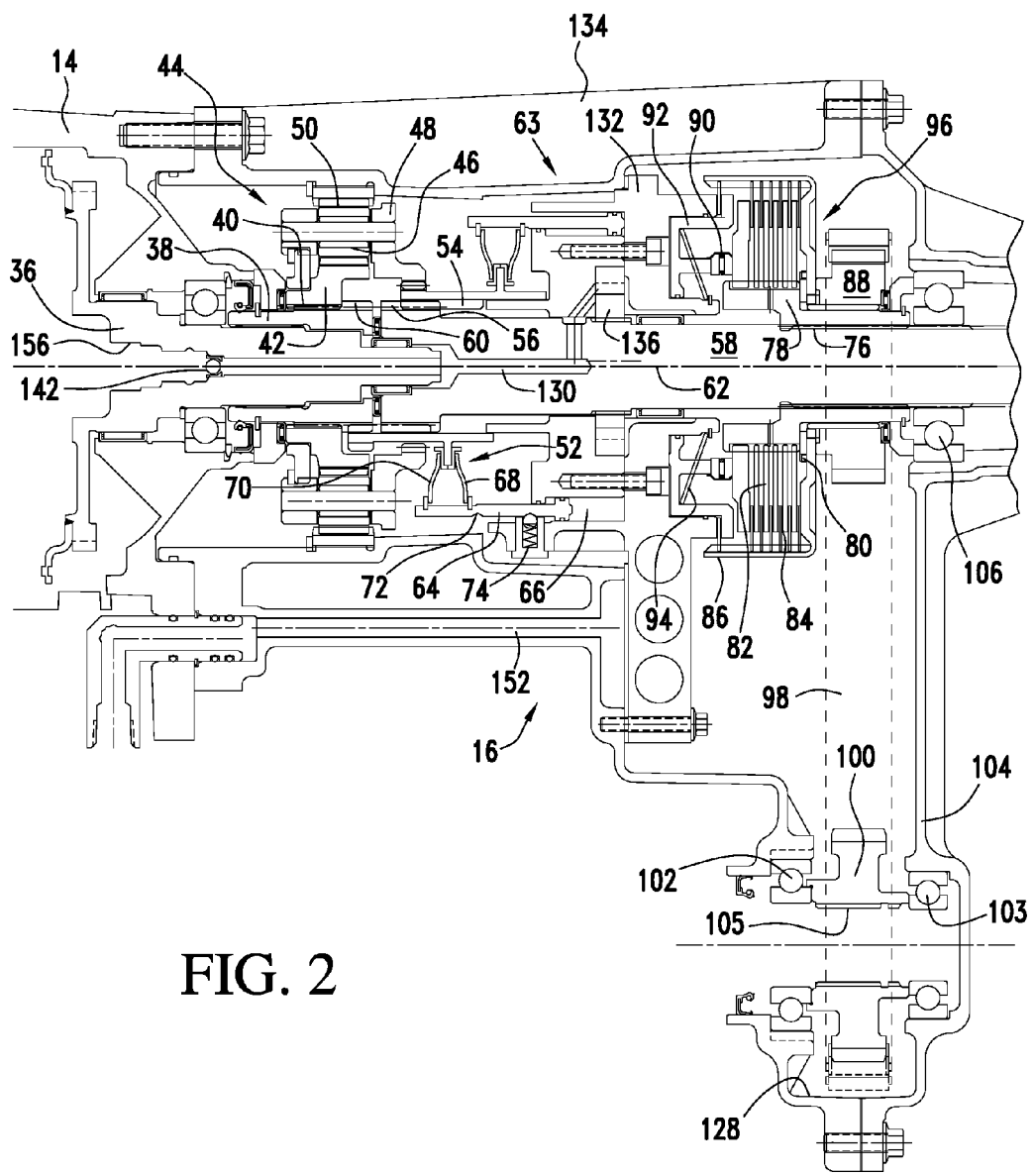
FIG. 2 is cross sectional side view showing the transfer case secured to the end of the transmission shown in FIG. 1.

Referring to FIG. 2, the output shaft 36 of the automatic transmission extends through the transmission case 14 into the transfer case 16. Shaft 36 is driveably connected through a spline to an intermediate shaft 38, which is connected by a spline 40 to the sun gear 42 of a simple planetary gear unit 44. Sun gear 42 is in continuous meshing engagement with a set of planet pinions 46, which are supported for a rotation on a pinion carrier 48. Each of the planet pinions 46 is in continuous meshing engagement with the sun gear 42 and a ring gear 50, which is secured against rotation on the transfer case 16. Gear unit 44, a simple planetary gear set with a grounded ring gear 50 and input to the sun gear 42, produces a low range torque ratio preferably in the range between 2.5 and 3:1. Loads from the gear unit are reacted by the transfer case housing 16 and, in the case of the sun gear 42, thrust loads are reacted by the transmission case 14 or through intermediate shaft 38, passing to output shaft 58, on through clutch ring 78, to sprocket wheel 88, bearing 106 and ultimately reacted to transfer case rear cover 104.

Carrier 48 is formed with internal dog clutch teeth, by which it is alternately connected to and disconnected from external dog clutch teeth formed on a high-low range change collar 52 depending on the axial position of the coupler. Internal dog clutch teeth 54, formed on coupler 52, are continually driveably connected by clutch teeth 56, formed on the output shaft 58 of the transfer case 16, which shaft is adapted for connection to the rear driveshaft 18. Intermediate shaft 38 is formed with external dog clutch teeth 60, which are alternately engaged with and disengaged from output shaft 58, depending on the axial location of the clutch teeth 54 formed on coupler 52.

In operation, to shift from high-range to low-range, the vehicle must be stopped. When the range coupler 52 is in the axial position shown below the central axis 62 in FIG. 2, coupler teeth 54 engage both teeth 56 on output shaft 58 and teeth 60 in intermediate shaft 38, and the coupler 52 is disengaged from carrier 48, thereby driveably connecting the transmission output 36 and output shaft 58 and producing a 1:1 gear ratio. When the range coupler 52 is in the axial position shown above the central axis 62 in FIG. 2, coupler teeth 54 engage teeth 56 on output shaft 58, and the coupler 52 is engaged with carrier 48, thereby driveably connecting the transmission output 36 and output shaft 58 and producing a gear ratio between 2.5 and 3:1 through gear unit 44.

The range change system is actuated hydraulically by high low-servo 63, which includes a piston 64 that moves in a cylinder 66 concentrically with axis 62. Hydraulic pressure in cylinder 66, moves piston 64 and coupler 52 leftward from the position shown above axis 62 in FIG. 2 to produce the low range. Piston 64 is connected to coupler 52 by two Belleville springs 68, 70, which allow the engagement of dog teeth 56, 60 to complete, if a tooth block-out condition occurs during a shift to the high-range. The same function occurs for the engagement of dog teeth on coupler 52 to the carrier 48 for low range engagement. Spring force on coupler 52 allows the coupler to seat with any additional rotation. Piston 64 is formed with axially spaced detents 72 corresponding to the high-range position and the low-range position of coupler 52 and piston 64. Three detent spring-loaded ball assemblies 74, spaced angularly about axis 62 at about 120 degree intervals, keep the coupler 52 in position after the hydraulic power is removed, allowing the vehicle to be secured in park. One of these detent ball assemblies 74 includes a sensor that produces an electronic signal representing the range in which the transfer case 16 is engaged.

Spline 76 driveably connects shaft 58 to a clutch ring 78, which is formed on its outer surface with axially directed spline teeth 80. Spacer plates 82 are driveably engaged with the spline teeth 80 of clutch ring 78. Friction discs 84, interposed between successive spacer plates 82, are driveably engaged by spline teeth formed on the inner surface of a clutch drum 86, which is driveably connected to a drive belt sprocket wheel 88.

A hydraulically-actuated clutch piston 92 moves axially in response to the hydraulic pressure. Piston 92 moves rightward, applying force through a bearing 90 to the backing plate, friction discs 84 and spacer plates 82 creating a mutual frictional engagement, thereby driveably connecting output shaft 58 and sprocket wheel 88. When clutch 96 piston 90 is vented, piston 92 moves leftward to the position shown in FIG. 2, due to a force applied to the piston by a Belleville spring 94, thereby driveably disconnecting output 58 and sprocket wheel 88. In this way, clutch 96 alternately driveably connects and disconnects output 58 and sprocket wheel 92.

When clutch 96 is engaged, power is transmitted to the forward drive shaft 20 from the output shaft 58 by a drive belt 98, which is continually engaged with sprocket wheels 88 and 100. Bearings 102, 103 rotatably support sprocket wheel 100 on the transfer case rear cover 104 and transfer case front housing 134. Forward drive shaft 20 is driveably connected through a spline 105 formed on the inner surface of the sprocket wheel 100. In this way, when clutch 96 is engaged, output shaft 58 transmits power both to the rear drive shaft 18, which is connected by a universal joint to output shaft 58, and to the forward drive shaft 20.

In operation, front drive shaft 20 is driven alternately at the same speed as that of the transmission output shaft 36, or shaft 20 is underdriven in relation to the speed of shaft 36, in accordance with the position of the coupler 52 and piston 64.

Clutch 96 can be engaged regardless of the position of coupler 52 so that power is transmitted by the drive belt mechanism, which includes sprocket wheels 88, 100 and drive belt 98. In this way, both the forward drive shaft 20 and rear drive shaft 18 are driven alternately in the low-range and high-range, or only the rear drive shaft is driven in the low-range and high-range.

The transfer case 16 shares automatic transmission fluid (ATF), usually called oil, with the transmission 14, whose oil sump capacity is sized large enough to accommodate the oil that is located in the transfer case during operation.

Figure 3:
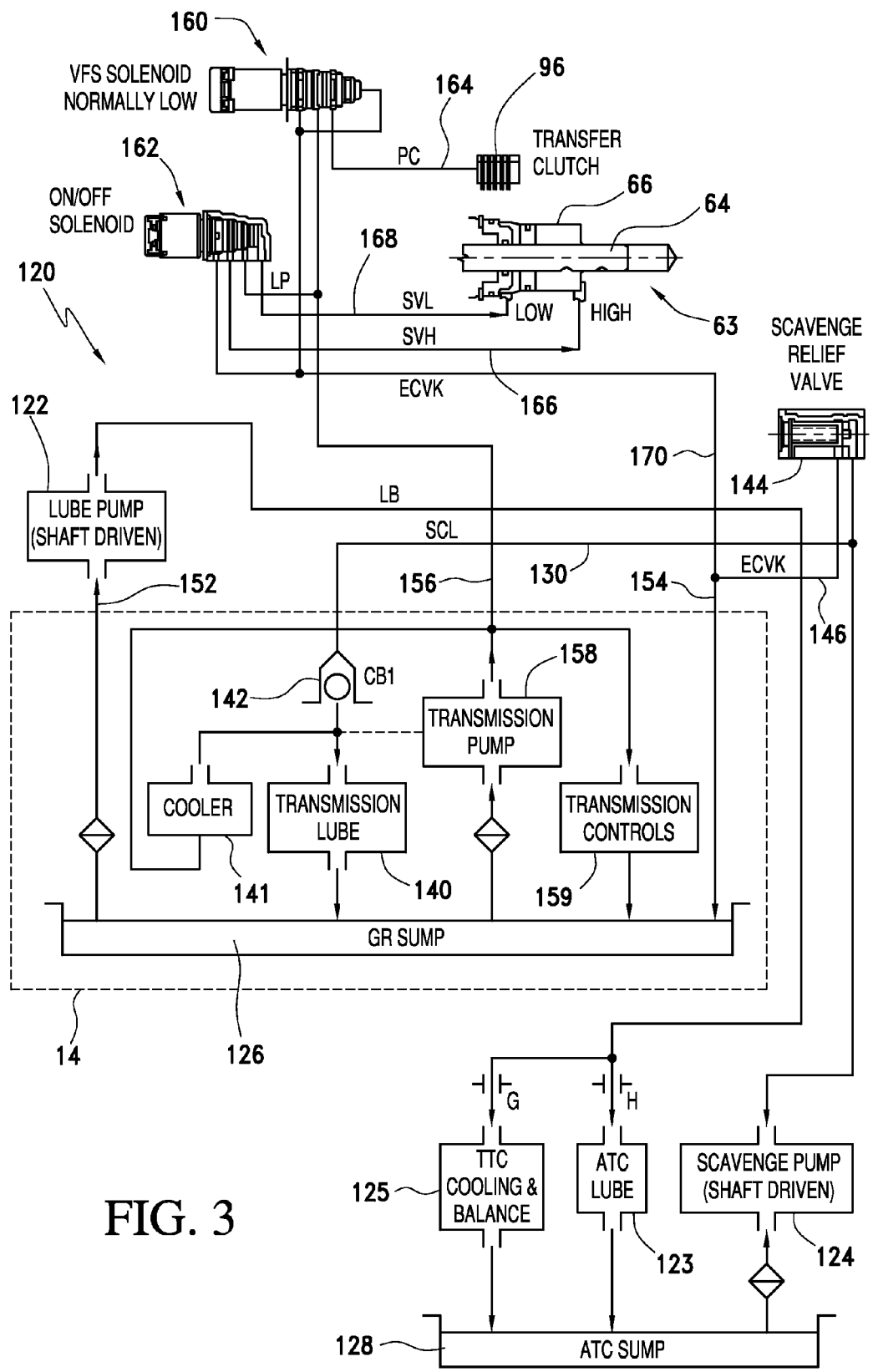
FIG. 3 is a schematic diagram of a hydraulic system located in the transfer case and transmission.

As shown in FIG. 3, the pump system and lubrication circuit of hydraulic system 120 includes two pump elements 122 and 124. Pump element 122 draws oil from the transmission sump 126 and supplies oil to a transfer case lube circuit 123, which carries hydraulic lubricant in fluid passages to components in the transfer case such as shafts 36, 38, 58, the bearings that support those shafts, clutch 96, gear unit 44, and to a circuit 125, which that cools the transfer clutch 96. Pump element 124, scavenges oil from a sump 128 located at the bottom of the transfer case rear cover 104 and returns oil to the transmission sump 126 either through line 130 or through lines 146 and 154, depending on whether transmission lube pressure is high or low relative to another pressure. The second pump element 124 is sized to ensure that the chain case sump 128 is a nearly dry in order to reduce splash losses. Pump elements 122 and 124 are driven by output shaft 58.

FIG. 2 shows an alternative pump arrangement, in which one pump element 136, driveably connected to output shaft 58, draws oil from the two sumps 126, 128 and performs the functions of the pump elements 122 and 124.

The transfer case valve body assembly 132 is sealed to the transfer case front housing 134, keeping lube oil from collecting in the chain case sump 128. This sealing allows for a smaller scavenge pump element 124 and is very important during operation on an incline to prevent transmission sump oil from backing up into the transfer case 16.

The transfer case pump system has the additional ability to supply oil to the transmission lube circuit 140, provided output shaft 58 is rotating and the transmission pump 158 is not operating, such as when a motor vehicle containing the transfer case 16 and transmission 14 is being towed with its wheels contacting the ground and the engine is not running. In that condition, the vehicle wheels drive output shaft 58 and scavenge pump 124, but the transmission pump 158 is not operating because the engine and transmission torque converter are not rotating. This condition, called "flat tow," is considered to occur at high vehicle speed (about 60-75 mph) and over a longer distance (about 500 miles) than the distance a wrecker would tow the vehicle (about 30 miles).

Scavenge pump 124 may pressurize the transmission lube circuit 140, which carries lube oil in fluid passages to transmission components such as bearings, shafts, clutches, gears, etc. A scavenge relief valve 144 limits the magnitude of pressure at the outlet of scavenge pump 124. A check ball 142 separates the outlet of scavenge pump 124 from transmission lube circuit 140. One side of check ball 142 communicates through line 130 with the outlet of scavenge pump 124; the opposite side of check ball 142 communicates through transmission oil cooler 141 with the outlet of transmission pump 158.

When the pressure in the transmission lube circuit 140 is present and greater than pressure in line 130, as when the transmission pump 158 is driven by the engine, the check ball 142 is seated or closed. Then lube oil from the scavenge pump 124 and scavenge relief valve 144 is carried in line 146 to the transmission sump 126, and oil from the transmission pump 158 and transmission oil cooler 141 flows through the transmission lube circuit 140 and returns to the transmission sump 126. Preferably the check ball 142 is located in the transmission output shaft 36.

But if pressure in the transmission lube circuit 140 is low relative to pressure at the scavenge pump outlet, as when the transmission pump 122 is not operating and the engine is not running, check ball 142 unseats or opens. Then, oil from scavenge pump 124 is supplied to the transmission lube circuit 140 through line 130 and check ball 142 and returns to the transmission sump 126.

Four passages cross the transmission/transfer case split line bringing oil to and from the transmission 14 to the transfer case valve body 132. One passage 156 is for transmission pressure which is generated by transmission pump 158, tapped off of the transmission valve body and routed to the transfer case valve body. This high pressure oil is used to actuate transfer clutch 96 and range change piston 64 of servo 63. The second passage 152 carries lube oil from the transmission sump 126 to the inlet of the transfer case pump element 122. The third passage 130 allows scavenge pump 124 oil to lube the transmission 14. The fourth passage 154 returns lube oil to the transmission sump 126.

A two-stage bleed variable force solenoid (VFS)-actuated valve 160 regulates line pressure in line 156 and the magnitude of pressure that actuates and vents the servo of transfer clutch 96. Transmission pump 158 supplies oil to a hydraulic control system, which controls operation of the transmission 14 and is located in the transmission.

Hydraulic system 120 also includes the transfer case valve body 132, separator plate, and four-port on/off solenoid-actuated valve 162. As shown in the schematic circuit diagram of FIG. 3, the range change piston 64 remains charged at all times by valve 162, which regulates the low and high magnitudes of pressure supplied through lines 166, 168, respectively, that actuate the servo of range-change coupler 52. All exhausts and vents lines 146, 154, 170 are routed to the transmission sump 126.

Each transfer case range change is made at zero vehicle speed. No change in state of the transfer clutch 96 occurs during a transmission shift event.

In accordance with the provisions of the patent statutes, the preferred embodiment has been described. However, it should be noted that the alternate embodiments can be practiced otherwise than as specifically illustrated and described.

What is claimed is:

1. A powertrain, comprising:
   a transmission including a pump, a sump and a lube circuit;
   a transfer case including an output driving a second pump;
   a circuit alternately supplying the lube circuit from the pump and connecting the second pump to the sump when lube circuit pressure exceeds pressure from the second pump, and connecting the second pump to the lube circuit when lube circuit pressure is less than pressure from the second pump.

2. The powertrain of claim 1 further comprising:
   a second lube circuit that supplies oil to components of the transfer case; and
   a third pump located in the transfer case and driveably connected to the output for supplying oil from the sump to the second lube circuit.

3. The powertrain of claim 2 wherein the second pump and the third pump are combined in one pump that is driveably connected to the output, draws oil from the sump and a second sump, supplies oil to the second lube circuit, and supplies oil to the lube circuit depending on a state of a check valve.

4. The powertrain of claim 1 further comprising:
   a second output;
   a clutch for alternately mutually engaging and releasing the output and the second output;
   a first valve actuated by a variable force solenoid and supplied with oil from the pump for alternately engaging and releasing the clutch by increasing and decreasing pressure supplied to the clutch.

5. The powertrain of claim 1 wherein the transfer case further comprises:
   an epicyclic gearset driveably connected to an input for driving the output at a speed that is less than a speed of the input,
   a coupler continually driveably connected to the output and actuated to engage alternately an output of the gearset and the input;
   a second valve actuated by a solenoid having an on state and an off state, and supplied with oil from the pump for actuating the coupler to connect the output alternately to the input in the on-state and to the output of the gearset in the off-state.

6. The powertrain of claim 1 further comprising:
a first set of wheels driveably connected to the output.

7. The powertrain of claim 1 further comprising:
a first set of wheels driveably connected to the output;
a second output;
a second set of wheels driveably connected to the second output;
a clutch for alternately mutually engaging and releasing the output and the second output;
a drive mechanism including a first sprocket wheel driveably connected to the clutch, a second sprocket wheel spaced from and aligned with the first sprocket wheel, and a drive belt engaged with the first sprocket wheel and second sprocket wheel.

8. A vehicle powertrain, comprising:
a transmission including a pump, a sump and a lube circuit;
a transfer case including an input, an output driving a second pump and a first set of wheels, a speed reduction gearset connected to the input, a coupler connected to the output and engaging alternately the input and the gearset;
a circuit supplying the lube circuit from the pump and connecting the second pump to the sump when lube circuit pressure exceeds pressure from the second pump, and connecting the second pump to the lube circuit when lube circuit pressure is less than pressure from the second pump.

9. The powertrain of claim 8 further comprising:
a second lube circuit that supplies hydraulic lubricant to components of the transfer case; and
a third pump located in the transfer case and driveably connected to the output for supplying oil from the sump to the second lube circuit.

10. The powertrain of claim 9 wherein the second pump and the third pump are combined in one pump that is driveably connected to the output, draws oil from the sump and a second sump, supplies oil to the second lube circuit, and supplies oil to the lube circuit depending on a state of a check valve.

11. The powertrain of claim 8 further comprising:
a second output;
a clutch for alternately mutually engaging and releasing the output and the second output;
a first valve actuated by a variable force solenoid and supplied with oil from the pump for alternately engaging and releasing the clutch by increasing and decreasing pressure supplied to the clutch.

12. The powertrain of claim 8 wherein the transfer case further comprises:
a valve actuated by a solenoid having an on state and an off state, and supplied with oil from the pump for actuating the coupler to connect the output alternately to the input in the on-state and to an output of the gearset in the off-state.

13. The powertrain of claim 8 further comprising:
a first set of wheels driveably connected to the output.

14. The powertrain of claim 8 further comprising:
a first set of wheels driveably connected to the output;
a second output;
a second set of wheels driveably connected to the second output;
a clutch for alternately mutually engaging and releasing the output and the second output;
a drive mechanism including a first sprocket wheel driveably connected to the clutch, a second sprocket wheel spaced from and aligned with the first sprocket wheel, and a drive belt engaged with the first sprocket wheel and second sprocket wheel.

15. The powertrain of claim 8 wherein the gearset further comprises:
a sun gear driveably connected to the input;
a ring gear held against rotation;
a carrier connectable to the coupler; and
a set of planet pinion supported on the carrier and engaged with the sun gear and the ring gear.

16. A motor vehicle powertrain for producing and transmitting power, comprising:
a transmission including a pump, a sump and a lube circuit;
a transfer case including an output driving a second pump connected to a first set of vehicle wheels and driven by the input through a gearset alternately at a low speed range and a high speed range;
a circuit supplying the lube circuit from the pump and connecting the second pump to the sump when lube circuit pressure exceeds pressure from the second pump, and connecting the second pump to the lube circuit when lube circuit pressure is less than pressure from the second pump.

17. The powertrain of claim 16 wherein the gearset further comprises:
a coupler connected to the output and engaging alternately the input and the gearset;
a sun gear driveably connected to the input;
a ring gear held against rotation on the transfer case;
a carrier connectable to the coupler; and
a set of planet pinion supported on the carrier and engaged with the sun gear and the ring gear.

18. The powertrain of claim 16 further comprising:
a second lube circuit that supplies oil to components of the transfer case; and
a third pump located in the transfer case and driveably connected to the output for supplying oil from the sump to the second lube circuit.

19. The powertrain of claim 16 further comprising:
a second output driveably connected to a second set of wheels;
a clutch for alternately mutually engaging and releasing the output and the second output;
a first valve actuated by a variable force solenoid and supplied with oil from the pump for alternately engaging and releasing the clutch by increasing and decreasing pressure supplied to the clutch.

20. The powertrain of claim 19 wherein the transfer case further comprises:
a coupler continually driveably connected to the output and actuated to engage alternately an output of the gearset and the input;
a second valve actuated by a solenoid having an on state and an off state, and supplied with oil from the pump for actuating the coupler to connect the output alternately to the input and to the output of the gearset.

* * * * *